United States Patent
Kauffeldt et al.

(10) Patent No.: US 6,922,530 B1
(45) Date of Patent: Jul. 26, 2005

(54) METHOD AND APPARATUS FOR OPTICAL CHANNEL SWITCHING IN AN OPTICAL ADD/DROP MULTIPLEXER

(75) Inventors: Hal V. Kauffeldt, Plano, TX (US); Hok Y. Pua, Plano, TX (US); Xiaojun Fang, Hayward, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/544,662

(22) Filed: Apr. 6, 2000

(51) Int. Cl.$^7$ .......................... H04J 14/00; H04J 14/02; H04B 10/00
(52) U.S. Cl. .............................................. 398/7; 398/83
(58) Field of Search ............................. 398/7, 4, 83, 2; 385/16–22

(56) References Cited

U.S. PATENT DOCUMENTS

| | | | |
|---|---|---|---|
| 5,483,372 A | 1/1996 | Green, Jr. .................. 359/173 |
| 5,771,112 A | 6/1998 | Hamel et al. ............... 359/128 |
| 5,778,118 A | 7/1998 | Sridhar ........................ 385/24 |
| 5,903,371 A * | 5/1999 | Arecco et al. ................. 398/4 |
| 5,956,319 A * | 9/1999 | Meli ........................... 370/224 |
| 5,999,291 A | 12/1999 | Anderson .................... 359/133 |
| 6,163,527 A * | 12/2000 | Ester et al. .................. 370/228 |
| 6,249,510 B1 * | 6/2001 | Thompson .................. 370/223 |
| 6,285,479 B1 * | 9/2001 | Okazaki et al. .............. 398/56 |
| 6,337,755 B1 * | 1/2002 | Cao ............................. 398/97 |
| 6,400,476 B1 * | 6/2002 | Arecco ........................... 398/9 |
| 6,519,064 B1 * | 2/2003 | Fatehi et al. .................. 398/84 |
| 6,590,681 B1 * | 7/2003 | Egnell et al. ................. 398/82 |
| 2002/0145779 A1 | 10/2002 | Strasser et al. ............. 359/124 |

FOREIGN PATENT DOCUMENTS

| | | | |
|---|---|---|---|
| EP | 0 920 153 A2 | 6/1999 | |
| EP | 0 949 777 A2 | 10/1999 | |
| EP | 1 014 613 A2 | 6/2000 | |
| WO | WO 98/47255 | * 10/1998 | ............ H04J/14/02 |
| WO | WO 99/65164 | 12/1999 | ......... H04B/10/213 |

OTHER PUBLICATIONS

J. Manchester et al., "The Evolution of Transport Network Survivability", IEEE Communication Magazine, Aug. 1999.*

(Continued)

Primary Examiner—M. R. Sedighian
Assistant Examiner—Shi K. Li
(74) Attorney, Agent, or Firm—Baker Botts L.L.P.

(57) ABSTRACT

An optical add/drop multiplexing unit (16, 116) includes a demultiplexer (53, 153) which optically isolates component signals of an optical input signal from an optical input terminal (22, 122). A plurality of switching units (61, 161) can optically couple either of two outputs to either of two inputs. One input of each switching unit receives a respective component signal from the demultiplexer, and the other is coupled to a respective protection input terminal (42, 142) of the multiplexing unit. One of the output terminals of each switching unit is coupled to a respective protection output terminal (43, 143), and the other is coupled to a respective input of a multiplexer (82, 182). The multiplexer has an output coupled to an optical output terminal (23, 123) of the multiplexing unit, and optically combines the signals at its inputs into an optical signal for its output. The multiplexing unit is operable to cause one of the component signals from the input signal to be routed to the further terminal, or to cause a component signal present at the further terminal to be included in the optical signal at the optical output terminal.

13 Claims, 6 Drawing Sheets

OTHER PUBLICATIONS

*ERION–Ericsson Opital Networking Using WDM Technology*, Ericsson Review No. 3, 1998, article printed on Feb. 27, 2002, pp. 132–137.

*ROADMap for the Metro Market*, Fiberoptic Product News, Oct. 2001, (http://www.fpnmag.com) (3 pages).

Rob Batchellor, *Optical Networking the Ericsson Way*, Ericsson Limited, Business Unit Transport and Cable Networks. Feb. 22, 2002 (3 pages).

*Broadcast and Select OADM Nodes Application and Performance Trade–offs*, OFC 2002, Tuesday Afternoon, Tuesday, Mar. 19, 2002, pp. 158–160.

Bellcore "*SONET Bidirectional Line–Switched Ring Equipment Generic Criteria*," A Module of TSGR, FR–440, Generic Requirements GR–1230–CORE, Issue 4, Dec. 1998 (274 pages).

Written Opinion for PCT US01/11203, 4 pages, Nov. 12, 2003.

* cited by examiner

METHOD AND APPARATUS FOR OPTICAL CHANNEL SWITCHING IN AN OPTICAL ADD/DROP MULTIPLEXER

TECHNICAL FIELD OF THE INVENTION

This invention relates in general to add/drop multiplexers and, more particularly, to add/drop multiplexers which operate optically.

BACKGROUND OF THE INVENTION

In a telecommunications system, it is often desirable to have a degree of redundancy, in case there is a partial or complete failure of a transmission line. A common technique in the industry is to provide a working transmission line, which typically includes several channels, and a redundant or "protection" transmission line, which also includes several channels. Typically, the channels of the working transmission line carry high priority traffic, and the channels of the protection transmission line carry low priority traffic. If there is a partial or complete failure in the working transmission line, the low priority traffic in some or all channels of the protection transmission line is interrupted, and the high priority traffic from some or all channels in the working transmission line is routed through respective channels which have been made available in the protection transmission line.

Information may be transmitted in electrical form through wire conductors, or in optical form through fiber-optic conductors. One industry standard for optical transmission is the Synchronous Optical Network standard, commonly known as SONET. In existing optical systems, including those which operate according to the SONET standard, the exchange of traffic between working and protection transmission lines is carried out at the electrical level, rather than the optical level. In particular, optical traffic from the working line is converted to electrical signals, transferred in electrical form to circuitry associated with the protection line, converted back to optical form, transmitted in optical form through the protection line, subsequently converted back to electrical form for transfer to the circuitry for the working line, and then converted back to optical form for further transmission through the working transmission line.

A separate consideration is that, in order to create multiple channels in a single fiber-optic transmission line, it is common to simultaneously transmit several optical signals through the transmission line at respective different wavelengths, which each correspond to a respective channel. This is known as wavelength division multiplexing (WDM). For each wavelength, the respective optical signal may also be time division multiplexed (TDM), for example to permit a number of different telephone conversations to be handled by a single optical signal at a respective wavelength.

At a location along the optical transmission line, for example at a switching facility, there may sometimes be a need to extract or "drop" one or more of the optical signals at respective wavelengths from an incoming transmission line, while routing the remaining optical signals from that line to an outgoing transmission line. Further, at the same location, there may be a need to add new optical signals at respective wavelengths into the overall signal transmitted on the outgoing transmission line. Typically, the added signals are transmitted at wavelengths which correspond to the wavelengths of the extracted or dropped signals. In order to effect these add and drop functions at an optical level, optical add/drop multiplexers have been developed. These devices are capable of optically extracting the signals to be dropped, passing the remaining signals through to the outgoing transmission line, and multiplexing onto the outgoing transmission line the signals which are being added.

Although these existing optical add/drop multiplexers have been adequate for their intended purposes, they have not been satisfactory in all respects. As one example, channel switching between working and protection transmission lines is still carried out at an electrical level rather than an optical level.

Above and beyond this, it is desirable to be able to effect channel switching between working and protected paths on a wavelength-by-wavelength basis, rather than by switching an entire WDM signal. For example, this permits a system operator to selectively specify that traffic on certain wavelengths of the protected path is nonpreemptable unprotected traffic (NUT), while permitting traffic on other wavelengths of the protection path to be selectively preempted.

SUMMARY OF THE INVENTION

From the foregoing, it may be appreciated that a need has arisen for a method and apparatus of multiplexing optical signals in a manner which has the capability to effect adding of a signal, dropping of a signal, and/or channel switching at an optical level. According to the present invention, a method and apparatus are provided to address this need, and involve multiplexing optical signals in a multiplexing unit which includes an optical input terminal, an optical input terminal, a plurality of protection input terminals, a plurality of protection output terminals, a further terminal, and a plurality of switching units that each have first and second inputs and first and second outputs.

More specifically, this method and apparatus involve: receiving at the optical input terminal an optical input signal which includes a plurality of optical component signals that are different; optically demultiplexing the input signal to isolate the respective component signals thereof; supplying each of the isolated component signals to the first input of a respective one of the switching units; operatively coupling each of the protection input terminals to the second input of a respective one of the switching units; operatively coupling each of the protection output terminals to the second output of a respective one of the switching units; causing each of the switching units to optically couple at least one of the outputs thereof to a selected one of the inputs thereof; optically multiplexing the optical signals from the second outputs of the switching units to produce a multiplexed signal; supplying to the optical output terminal an optical output signal which is based on the multiplexed signal; and carrying out one of: causing one of the component signals from the optical input signal to be routed to the further terminal, and causing a component signal present at the further terminal to be included in the optical output signal.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1A:
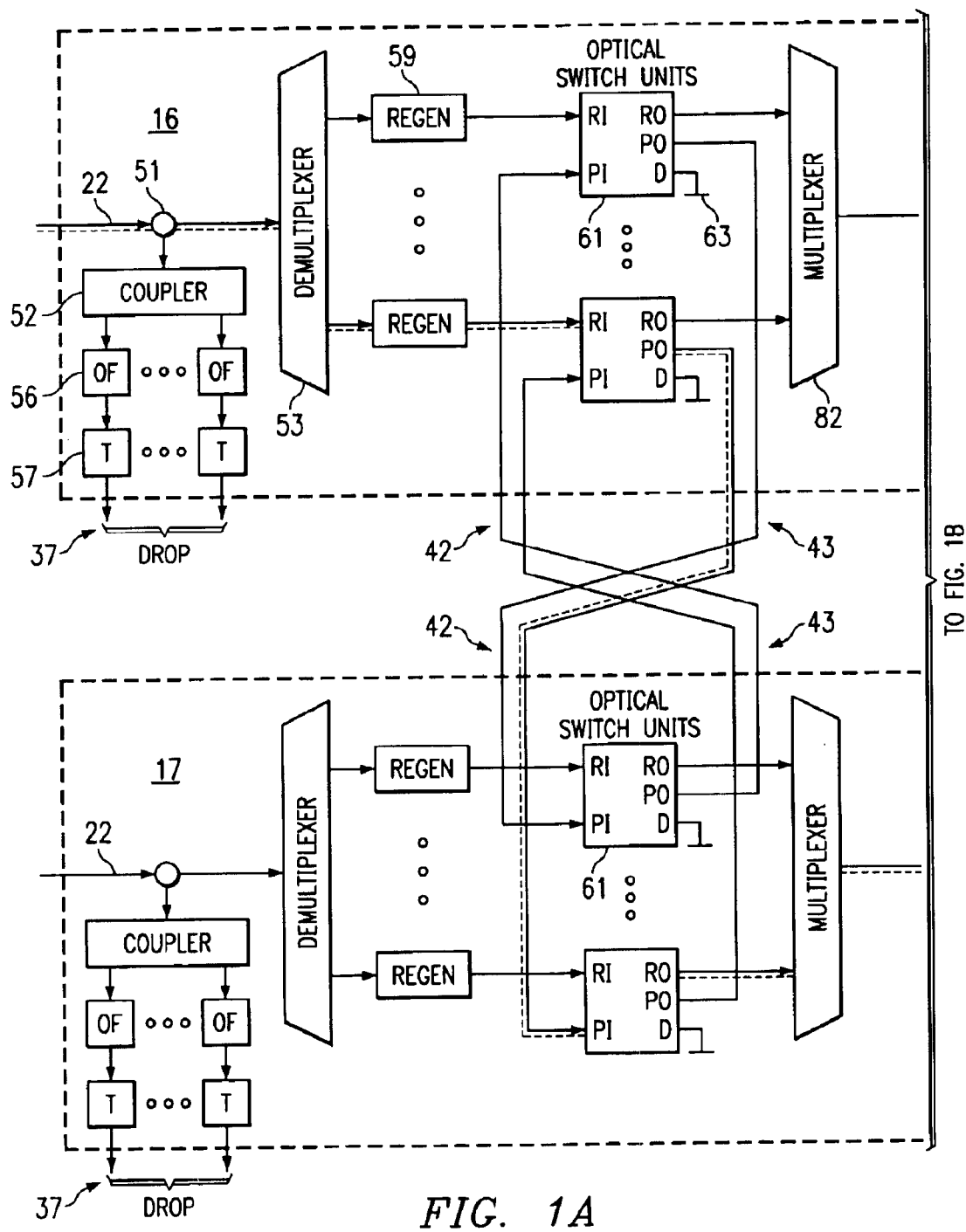
FIG. 1 is a block diagram of a first embodiment of a communications system which embodies the present invention.
Figure 1B:
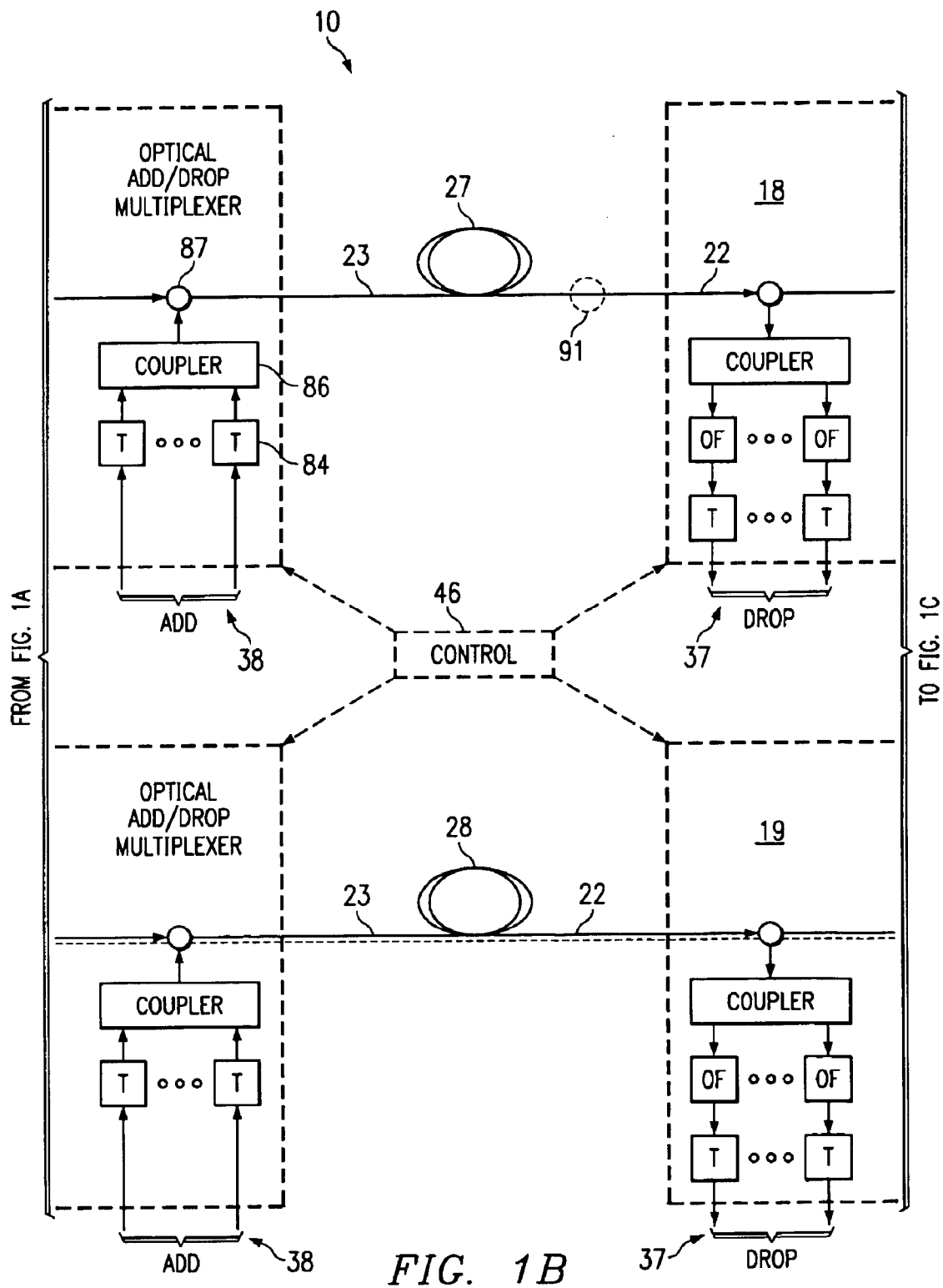
Figure 1C:
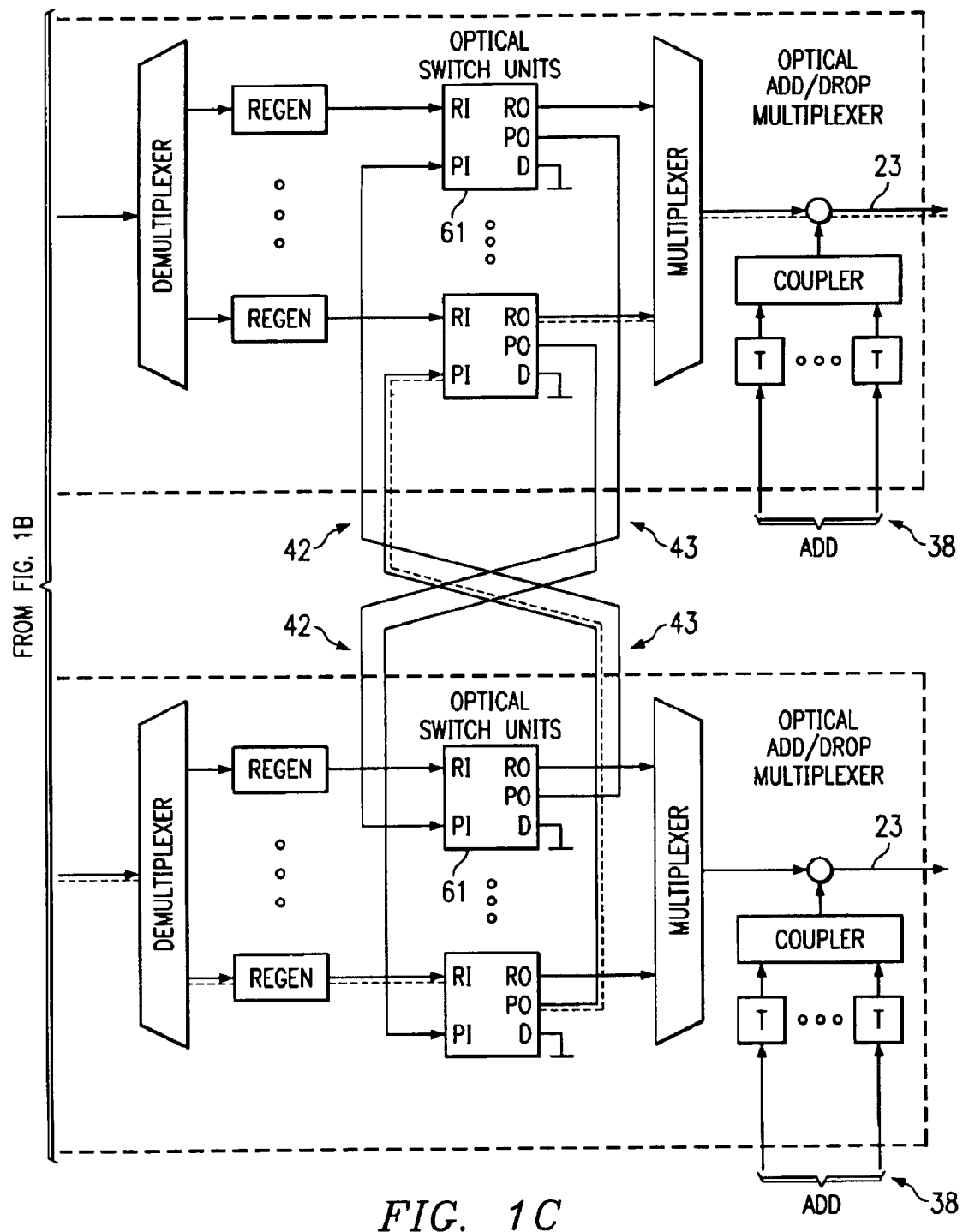

FIG. 1 is a block diagram of a communications system 10, which is a telecommunications system. The system 10 includes four optical add/drop multiplexer (OADM) units, which are respectively identified in FIG. 1 by reference numerals 16–19. In the embodiment of FIG. 1, the OADM units 16–19 are identical to each other.

In this regard, each OADM unit 16–19 has an optical input terminal 22, to which can be applied an optical input signal that is made up of a plurality of component signals. Each of the component signals has a respective different wavelength, and represents a respective channel of information. This type of signal is known in the art as a wavelength division multiplexed (WDM) signal. Each OADM unit 16–19 also includes an optical output terminal, at which the OADM unit produces an optical output signal made up of a plurality of component signals that each have a respective different wavelength. The output terminal 23 of the OADM unit 16 is coupled by an optical transmission line 27 to the optical input terminal 22 of the OADM unit 18. Similarly, the output terminal 23 of the OADM unit 17 is coupled by an optical transmission line 28 to the input terminal 22 of the OADM unit 19. In the embodiment of FIG. 1, each of the transmission lines 27 and 28 includes an optical fiber.

In FIG. 1, the optical path which includes the OADM units 16 and 18 and the transmission line 27 represents a working path, and the optical path which includes the OADM units 17 and 19 and the transmission line 28 represents a protection path. The concept of working and protection paths has been discussed above. In essence, the protection path provides partial or complete redundancy to the working path, in case a fault develops along the working path.

The OADM units 16–19 each include a plurality of drop terminals 37 which are outputs, and a plurality of add terminals 38 which are inputs. Further, each OADM unit 16–19 has a plurality of protection input terminals 42, and a plurality of protection output terminals 43. The protection output terminals 43 of the unit 16 are each coupled to a respective one of the protection input terminals 42 of the unit 17, and the protection output terminals 43 of the unit 17 are each coupled to a respective one of the protection input terminals 42 of the unit 16. Similarly, the protection output terminals 43 of the unit 18 are each coupled to a respective one of the protection input terminals 42 of the unit 19, and the protection output terminals 43 of the unit 19 are each coupled to a respective one of the protection input terminals 42 of the unit 18. The communications system 10 of FIG. 1 also includes a control system, which is shown diagrammatically at 46, and which is operatively coupled to each of the OADM units 16–19.

As mentioned above, the OADM units 16–19 are identical to each other in the embodiment of FIG. 1. Accordingly, the internal structure of these OADMs is described only for one of them, which is the unit 16. More specifically, the optical input terminal 22 of the OADM unit 16 is coupled to an input of an optical coupler 51, which is a component of a known type. The optical coupler 51 serves as an optical splitter, which supplies the optical input signal to an input of a further optical coupler 52, and also to an input of an optical demultiplexer 53. The coupler 52 and the demultiplexer 53 are each a known type of component. The optical coupler 52 serves as a further splitter, and supplies the optical input signal to each of a plurality of outputs. The outputs of the optical coupler 52 are each coupled through a respective optical rejection filter 56 and transponder 57 to a respective one of the drop terminals 37 of the unit 16. Each of the optical filters 56 is a known type of component which permits only optical signals at a specified wavelength to pass therethrough, each of the filters 56 being set to pass signals at a respective different wavelength. Thus, the outputs of the optical filters 56 will each carry a respective one of the different component signals that make up the WDM optical input signal received at the input terminal 22.

The transponders 57 are each a known type of component. The transponders 57 are each optional, but are shown in FIG. 1 for purposes of completeness. When present, each transponder 57 converts the optical signal present at its input to a corresponding electrical signal.

As noted above, the optical demultiplexer 53 receives at its input the WDM optical input signal from the input terminal 22, which includes a plurality of component signals at respective different wavelengths. The demultiplexer 53 optically isolates each of these component signals, and supplies each isolated component signal to a respective one of its plural outputs. Each of the outputs of the demultiplexer 53 is coupled through a respective regenerator 59 to a respective one of a plurality of switching units 61. The regenerators 59 are components of a known type and are optional, but have been shown in FIG. 1 for purposes of completeness. When present, each regenerator 59 converts the optical component signal present at its input into an electrical signal, and then processes the electrical signal in a known manner in order to improve its form, for example by removing noise. Then, the regenerator 59 converts the improved electrical signal back into an optical signal, and transmits the optical signal through the output of the regenerator 59.

Turning now to the switching units 61, each switching unit has two inputs, including a regular input RI which is coupled to the output of respective one of the regenerators 59, and a protection input PI which is coupled to a respective one of the protection inputs 42 of the unit 16. Each switching unit 61 also has three outputs, including a regular output RO, a protection output PO which is coupled to a respective one of the protection output terminals 43 of the unit 16, and a drop output D which is terminated in a known manner at 63.

Figure 2:
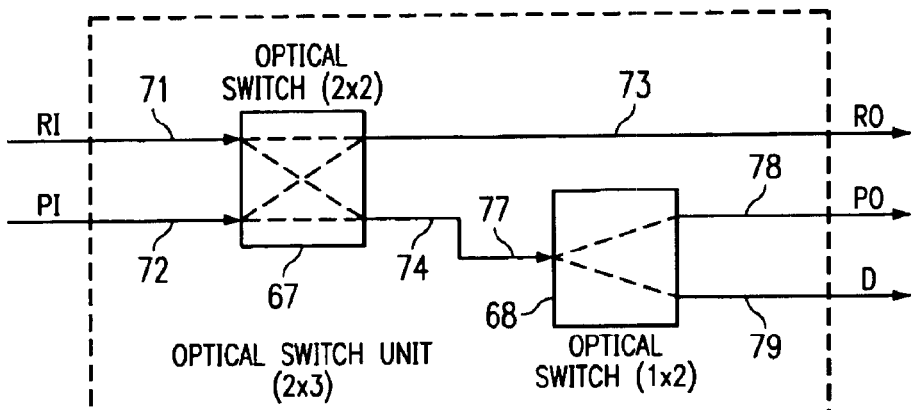
FIG. 2 is a diagrammatic view of an optical switch unit which is a component of the system of FIG. 1.

All of the switching units 61 have the same internal structure. This internal structure is shown in more detail in FIG. 2, which is a block diagram of one of the switching units 61. As shown in FIG. 2, each switching unit 61 includes two optical switches 67 and 68, which are each a component of a known type. The optical switch 67 has two inputs 71 and 72 which are respectively coupled to the regular input RI and the protection input PI of the switching unit 61. The switch 67 also has a first output 73 which is coupled to the regular output RO of the unit 61, and has a further output 74. The second optical switch 68 has an input 77 which is coupled to the output 74 of the switch 67, and also has two outputs 78 and 79 which are respectively coupled to the protection output PO and the drop output D of the switching unit 61.

The optical switch 67 has two operational modes, which are mutually exclusive. In the first operational mode, the switch 67 optically couples the input 71 to the output 73, and the input 72 to the output 74. In the second operational mode, it optically couples the input 71 to the output 74, and the input 72 to the output 73. The second optical switch 68 also has two operational modes which are mutually exclusive. In the first operational mode, the input 77 is optically coupled to the output 78, and in the second operational mode the input 77 is optically coupled to the output 79. Thus, at any point in time, the regular output RO of the switching unit 61 will be optically coupled to one of its two inputs RI and PI, and the other of the two inputs RI and PI will be optically coupled to one of the outputs PO and D. The optical switches 67 and 68 are each controlled by the control system 46 (FIG. 1).

Referring again to FIG. 1, the regular outputs RO of the switching units 61 are each coupled to respective input of an optical multiplexer 82, which is a component of a known type. The multiplexer 82 combines or multiplexes the respective optical signals from each of the switching units 61 into a single WDM optical signal, which is supplied to an output of the multiplexer 82. The add terminals 38 of the unit 16 are each coupled through a respective transponder 84 to a respective input of an optical coupler 86.

The transponders 84 are components of a known type, and are optional. When they are present, the signals supplied to the add terminals 38 are electrical signals, and the transponders 84 convert them into optical signals, which are then supplied to the coupler 86. If the transponders 84 are omitted, the signals applied to the add terminals 38 are optical signals, and are supplied directly to the inputs of the coupler 86. In either case, the signals supplied to the respective inputs of the coupler 86 are each a component signal having a respective wavelength. The coupler 86 is a component of a known type, and serves as a multiplexer which optically combines or multiplexes all of the component signals from the add terminals 38, and then supplies the resulting WDM optical signal to an output of the coupler 86.

A further coupler 87 is a component of a known type, which has two inputs that are respectively coupled to the output of the multiplexer 82 and the output of the coupler 86. The coupler 87 has an output which is coupled to the output terminal 23 of the OADM unit 16. The coupler 87 serves as a multiplexer, which optically combines or multiplexes the optical signals from the multiplexer 82 and the coupler 86 so as to generate a composite WDM optical signal, which is the optical output signal that the unit 16 transmits through its output terminal 23.

The operation of the system 10 of FIG. 1 will now be briefly described. For simplicity, assume that the WDM optical input signal supplied to the input terminal 22 of the OADM unit 16 is made up of N optical component signals which have respective wavelengths $\lambda_1$ through $\lambda_N$. The coupler 51 supplies this input signal to the coupler 52, which in turns supplies it to the inputs of each of the optical filters 56. Assume that there are N optical filters 56, which as discussed above are each designed to pass optical signals at a respective different one of the N wavelengths. Thus, each of the N component signals will be isolated, and will appear by itself at the output of a respective one of the N filters 56. Then, each of these component signals will appear at a respective one of the drop terminals 37, as an electrical signal if the transponders 57 are present, or as an optical signal if the transponders 57 are not present. Some, all or none of the component signals may be extracted from the corresponding drop terminals 37 for use locally of the unit 16. Each such signal which is extracted for local use is referred to as a wavelength which is being "dropped" by the unit 16.

The optical input signal, including all of its component signals, is also supplied by the coupler 51 to the input of the demultiplexer 53, which optically isolates each of the component signals and then supplies each isolated component signal to a respective one of its outputs. If the regenerators 59 are present, they regenerate each such component signal. Ultimately, each such component signal is supplied to the regular input RI of a respective one of the switching unit 61. Assuming that there are currently no faults in the system, the protection input PI of each switching unit 61 will not be in current use. As to component signals which are being dropped, the corresponding switching units 61 will each be set to couple the regular input RI to the drop output D, so that each dropped component signal is terminated at the associated termination 63.

As to the remaining component signals, which are not being dropped, the corresponding switching units 61 are each set to couple the regular input RI to the regular output RO. Thus, the multiplexer 82 receives only the component signals which are not being dropped at the unit 16. The multiplexer 82 then combines these component signals into a WDM signal, and supplies the WDM optical signal to the coupler 87.

One or more of the add terminals 38 can be used to add new component signals to the WDM optical signal produced by the multiplexer 82. Each such added component signal would have a wavelength which is different from any wavelength already present in the WDM optical signal produced by the multiplexer 82. Typically, a component signal added at 38 will have the same wavelength as a respective one of the component signals which has been dropped through one of the drop terminals 37. To the extent that one or more component signals are supplied to the add terminals 38, the coupler 86 will combine them into a WDM optical signal, and then coupler 87 will combine the two WDM optical signals from the coupler 86 and the multiplexer 82 into a composite WDM optical signal, which is supplied to the output terminal 23 of the unit 16.

As mentioned above, units 16 and 18 and transmission line 27 of FIG. 1 represent a working path, and units 17 and 19 and transmission line 28 represent a protection path. As is known in the art, the working path is typically used to carry high priority traffic, and the protection path is typically used to carry lower priority traffic so long as there is no problem with the working path. If a problem occurs with the working path, some or all of the lower priority traffic on the protection path is interrupted, so that the protection path can be used to carry higher priority traffic that would have normally have been transmitted through the working path.

Depending on the nature of the fault along the working path, all channels or wavelengths of the working path may be diverted to the protection path, or only a selected subset of the channels or wavelengths on the working path may be diverted to corresponding channels or wavelengths in the protection path. To the extent that only a portion of the channels or wavelengths are diverted from the working path to the protection path, the remaining channels or wavelengths of the protection path can continue to be used for the lower priority protection traffic. A specific example will now be given of how traffic from the working path might be diverted to the protection path in the embodiment of FIG. 1. For purposes of simplicity in this example, it is assumed that all of the traffic from the working path is diverted to the protection path, and that all of the traffic in the protection path is interrupted.

Assume that a break occurs at the location 91 in the transmission line 27. This might, for example, occur as a result of the transmission line 27 being buried in the earth, and being inadvertently severed by a piece of construction equipment digging a hole. When the break at 91 is detected, the control system 46 implements appropriate control to the switching units 61 in each of the OADM units 16–19, so as to divert all of the traffic that was flowing through the working transmission line 27 in a manner causing it to flow through the protection transmission line 28. In particular, the switching units 61 in the units 16 and 19 are each set to couple the regular input RI to the protection output PO, and the switching units 61 in the units 17 and 18 are each set to couple the protection input PI to the regular output RO. A dotted line in FIG. 1 shows how one of the component signals at a respective wavelength would be routed in sequence through the OADM 16, the OADM 17, the transmission line 28, the OADM 19, and the OADM 18.

Figure 3:
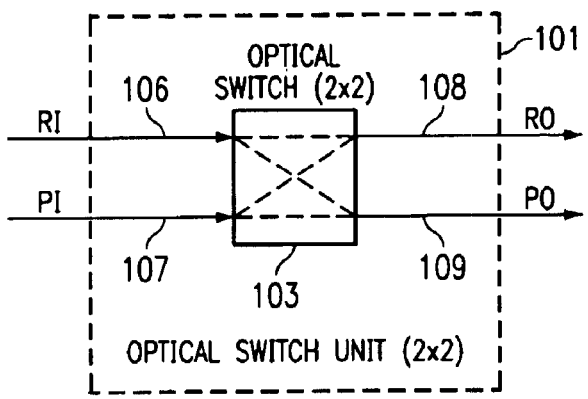
FIG. 3 is a diagrammatic view of an optical switch unit which is an alternative embodiment of the optical switch unit of FIG. 2.

As discussed above, the switching units 61 in the embodiment of FIG. 1 each have three outputs, one of which is the drop output D. In an alternative version of the embodiment of FIG. 1, the drop output D could be omitted from each of the switching units 61. In this regard, FIG. 3 shows an optical switching unit 101 which could be substituted for each of the optical switching units 61 shown in FIG. 1. The switching unit 101 contains a single optical switch 103 of a known type, which has two inputs 106 and 107 respectively coupled to the regular input RI and protection input PI of the switching unit 101. The optical switch 103 also has two outputs 108 and 109, which are respectively coupled to the regular output RO and protection output PO of the switching unit 101.

The switch 103 has first and second operational modes which are mutually exclusive. In the first operational mode, the input 106 is optically coupled to the output 108, and the input 107 is optically coupled to the output 109. In the second operational mode, the input 106 is optically coupled to the output 109, and the input 107 is optically coupled to the output 108.

In an alternative version of the embodiment of FIG. 1, which uses the switching units 101 in place of the switching units 61, the switching units 101 which correspond to dropped component signals would be set to the opposite operational mode from which they would be set if the associated component signal was not being dropped. For example, when there were no faults in the working path and no protection diversion was in effect, each optical switch would be set to couple its regular input RI to its regular output RO if the associated component signal was not being locally dropped, but would be set to couple its regular input RI to its protection output PO if the component signal was being dropped. The protection output PO of this switching unit would be coupled to the protection input PI of another switching unit 101 over in the protection path, which would be set to ignore its protection input PI. As a result, the component signal would be ignored, and thus dropped. On the other hand, if protection diversion was in effect, the switching unit 101 along the working path would normally route a component signal from its regular input RI to its protection output PO, but if the component signal was being dropped it would be routed from the regular input RI to the regular output RO, because the system would be effectively ignoring that regular output RO.

Figure 4A:
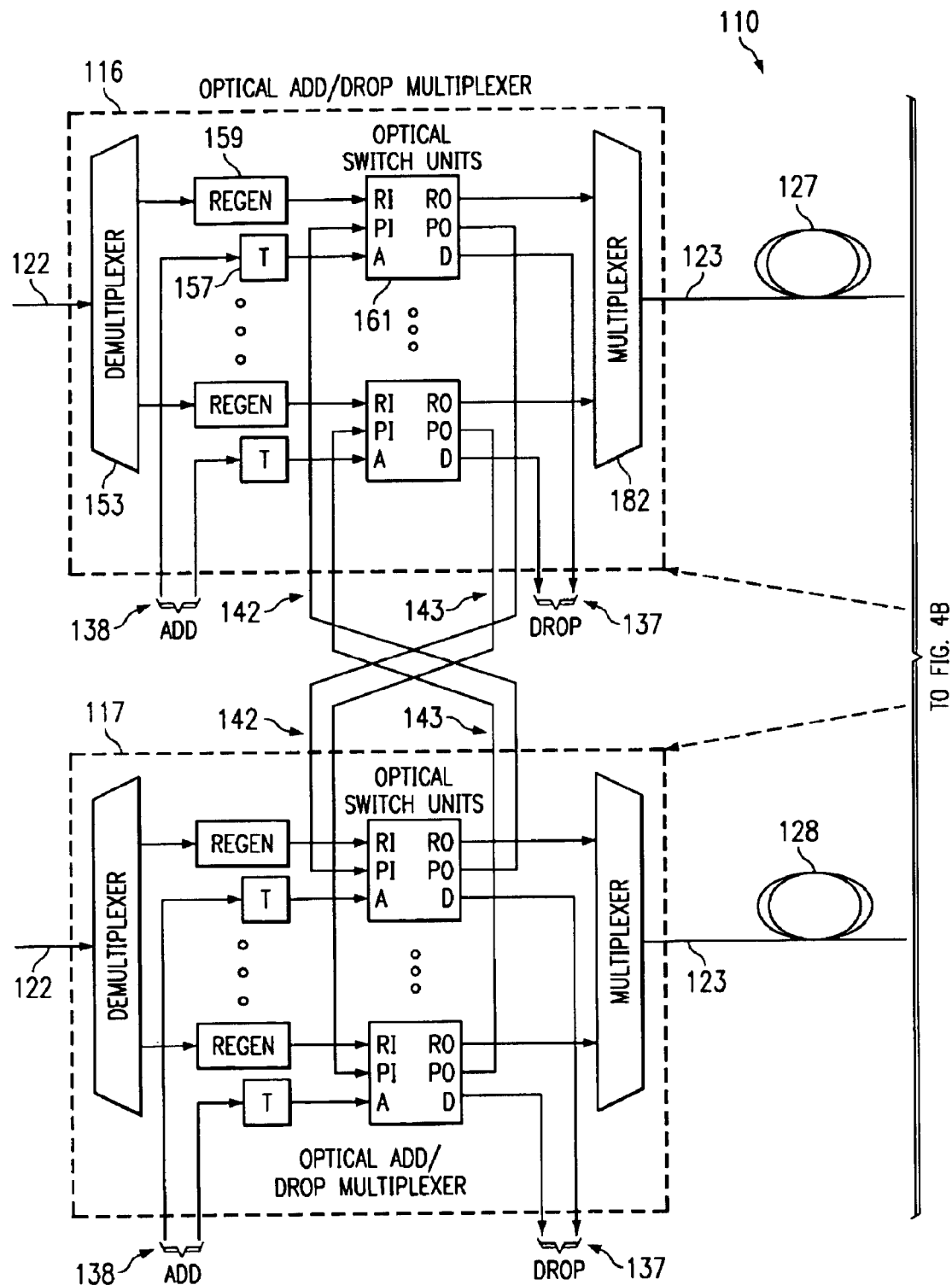
FIG. 4 is a block diagram of a communications system which is an alternative embodiment of the communications system of FIG. 1.
Figure 4B:
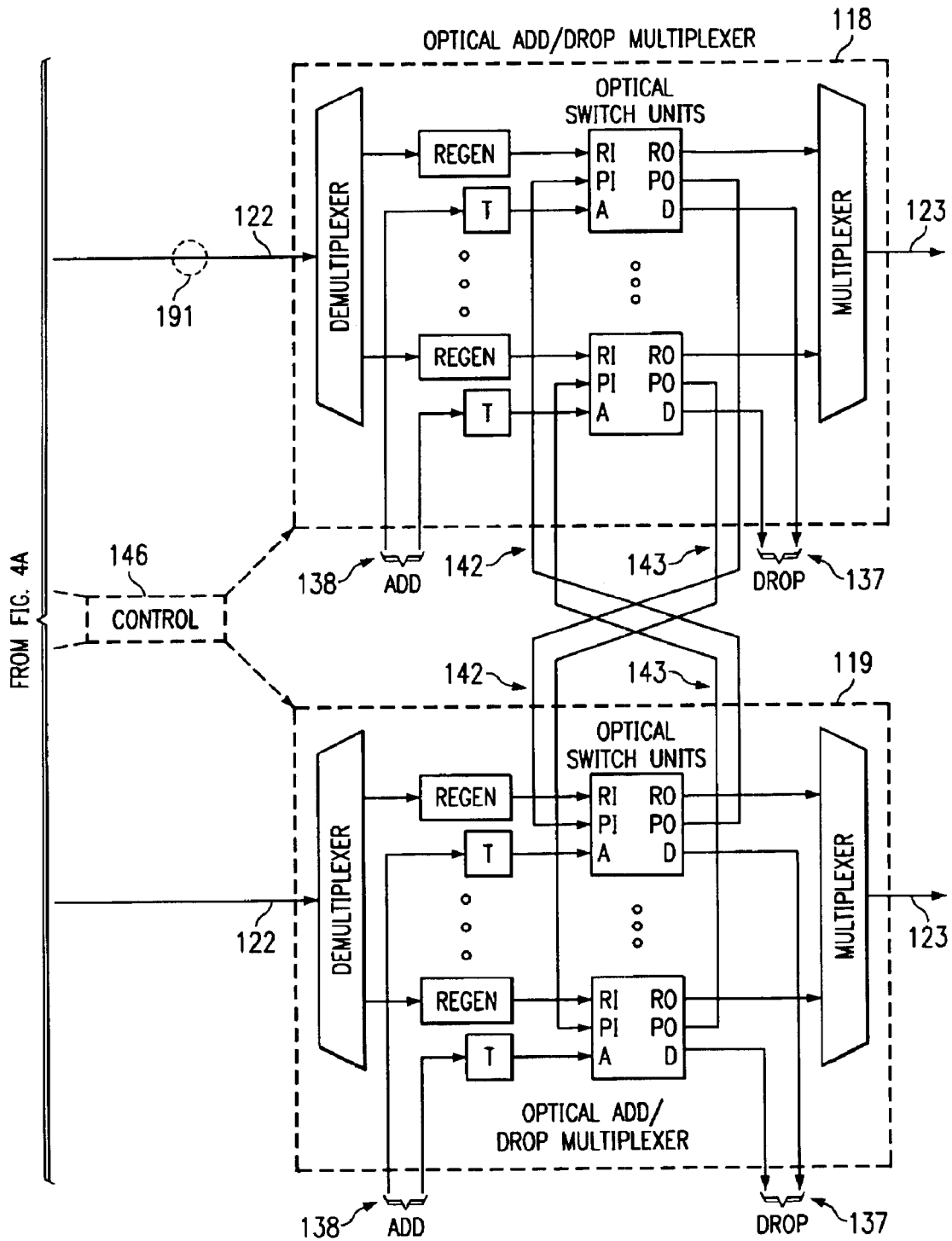

FIG. 4 is a block diagram of a communications system 110, which is a further alternative embodiment of the system 10 of FIG. 1. The system 110 of FIG. 4 is a telecommunications system, and includes four OADMs 116–119, each of which has an optical input terminal 122 and an optical output terminal 123. The output terminal 123 of the unit 116 is coupled through an optical transmission line 127 to the input terminal 122 of the unit 118, and the output terminal 123 of the unit 117 is coupled through an optical transmission line 128 to the input terminal 122 of the unit 119. The units 116 and 118 and transmission line 127 represent a working path, and the units 117 and 119 and transmission line 128 represent a protection path.

Each of the units 116–119 has a plurality of drop terminals 137, and a plurality of add terminals 138. Further, each of these units has a plurality of protection input terminals 142, and a plurality of protection output terminals 143. The protection output terminals 143 of the unit 116 are each coupled to a respective one of the protection input terminals 142 of the unit 117, and the protection output terminals 143 of the unit 117 are each coupled to a respective one of the protection input terminals 142 of the unit 116. Similarly, the protection output terminals 143 of the unit 118 are each coupled to a respective one of the protection input terminals 142 of the unit 119, and the protection output terminals 143 of the unit 119 are each coupled to a respective one of the protection input terminals 142 of the unit 118. The units 116–119 are all controlled by a control system, which is shown diagrammatically at 146.

The OADM units 116–119 each have the same internal structure, and therefore only the internal structure of the unit 116 will be described in detail. More specifically, the input terminal 122 of the unit 116 is coupled to the input of an optical demultiplexer 153, which is functionally equivalent to the demultiplexer 53 discussed above in association with FIG. 1. Each of the outputs of the demultiplexer 53 is coupled through a respective optional regenerator 159 to an input of a respective one of the optical switching units 161. The add terminals 138 are each coupled through a respective transponder 157 to an input of a respective one of the switching units 161.

The regenerators 159 and transponders 157 are optional, and are functionally equivalent to the regenerators 59 and transponders 57 discussed above in association with FIG. 1. If the transponders 157 are present, then electrical signals are supplied to the add terminals 138, and are converted by the transponders into optical signals. Otherwise, if the transponders 157 are omitted, optical signals are supplied to the add terminals 138, and are supplied directly to the switching units 161.

Each of the switching units 161 has three inputs and three outputs. In particular, each switching unit 161 has a regular input RI which is coupled to the output of a respective regenerator 159, a protection input PI which is coupled to a respective one of the protection input terminals 142, and an add input A which is coupled to the output of a respective one of the transponders 157. The three outputs of each switching unit 161 include a regular output RO, a protection output PO which is coupled to a respective one of the protection terminals 143, and a drop output D which is coupled to a respective one of the drop terminals 137.

Figure 5:
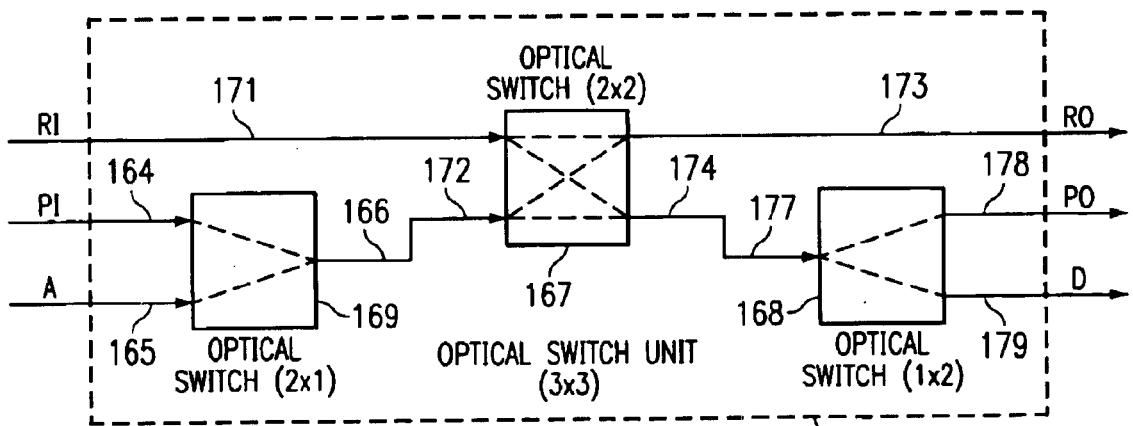
FIG. 5 is a diagrammatic view of an optical switch unit which is component of the system of FIG. 4.

The optical switching units 161 of FIG. 4 are all the same, and FIG. 5 is a block diagram showing the internal structure of one of the switching units 161. With reference to FIG. 5, each switching unit 161 includes three optical switches 167–169, which are each a component of a known type. The optical switch 169 has two inputs 164 and 165, which are respectively coupled to the protection input PI and the add input A of the switching unit 161. The optical switch 169 also has an output 166. The optical switch 167 has two inputs 171 and 172, which are respectively coupled to the regular input RI of the switching unit 161, and the output 166 of the switch 169. The optical switch 167 has two outputs 173 and 174, which are respectively coupled to the regular output RO of the switching unit 161, and to an input 177 of the optical switch 168. The optical switch 168 has two outputs 178 and 179, which are respectively coupled to the protection output PO and the drop output D of the switching unit 161.

The switch 169 has two operational modes which are mutually exclusive. In the first operational mode the input 164 is optically coupled to the output 166, and in the second operational mode the input 165 is optically coupled to the output 166. The switch 167 has two operational modes which are mutually exclusive. In the first operational mode the inputs 171 and 172 are respectively coupled to the outputs 173 and 174, and in the second operational mode the inputs 171 and 172 are respectively coupled to the outputs 174 and 173. The switch 168 has two operational modes which are mutually exclusive. In the first operational mode the input 177 is optically coupled to the output 178, and in the second operational mode the input 177 is optically coupled to the output 179. The switches 167–169 are controlled by the control system 146 (FIG. 4).

Referring again to FIG. 4, the OADM unit 116 also includes a multiplexer 182, which is functionally equivalent to the multiplexer 82 of FIG. 1, and which has a plurality of inputs that are each coupled to the regular output RO of a respective one of the switching units 161. The multiplexer 182 has an output which is coupled to the output terminal 123 of the unit 116. It should be noted that the system 110 of FIG. 4 uses one regenerator 159 and one transponder 157 per channel, whereas the system 10 of FIG. 1 uses one regenerator 59 and two transponders 57 and 84 per channel.

The operation of the system 110 shown in FIG. 4 is similar to the operation described above for the system 10 of FIG. 1. Accordingly, a separate detailed explanation of the operation of the system 110 is believed to be unnecessary. The system 110 would respond to a break at 191 in the transmission line 127 in a manner comparable to that described above for the break 91 in the transmission line 27 of the system 10 of FIG. 1.

The present invention has a number of technical advantages. One such technical advantage is the provision, at an optical level, of protection capability for optical signals, which facilitates an increase in reliability for optical transmissions. A related technical advantage is that this is provided in the context of an optical add/drop multiplexer.

Yet another technical advantage is that capability is provided for optically switching between working and protected paths on a wavelength-by-wavelength basis, rather than switching an entire WDM signal. This in turn permits a system operator to selectively specify that traffic on certain wavelengths of the protected path is non-preemptable unprotected traffic (NUT), while permitting traffic on other wavelengths of the protection path to be selectively preempted. Still another advantage is that, in one disclosed embodiment, only one regenerator and one transponder are needed for each wavelength or channel in a given optical add/drop multiplexer. Another technical advantage is the provision of an embodiment in which add terminals and drop terminals of a multiplexer are coupled to optical switching units that also implement protection switching, thereby avoiding the need to provide separate optical couplers and optical filters to implement adding and dropping of signals, which in turn reduces the overall hardware in the add/drop multiplexer, and thus its cost.

Although certain selected embodiments have been illustrated and described in detail, it will be recognized that various substitutions and alterations can be made therein without departing from the scope of the present invention. For example, it will be recognized that certain components and configurations of components have been used in the disclosed embodiments in order to realize certain functions, but that other components and/or configurations of components could be used to achieve these same functions. It will also be recognized that direct connections disclosed herein could be altered, such that two disclosed components would be coupled to one another through an intermediate component or components, without being directly connected, while still realizing the present invention. Other substitutions and alterations are also possible without departing from the spirit and scope of the present invention, as defined by the following claims.

What is claimed is:

1. An apparatus, comprising a multiplexing unit which includes:

an optical input terminal to which can be applied an optical input signal that includes a plurality of optical component signals which are different;

an optical output terminal at which said multiplexing unit produces an optical output signal;

a plurality of protection input terminals;

a plurality of protection output terminals;

a demultiplexer having an input coupled to said optical input terminal, and having a plurality of outputs, said demultiplexer being operable to optically isolate the component signals of the input signal, and to optically supply each of the isolated component signals to a respective one of said outputs thereof;

a plurality of switching units each having first and second inputs and first and second outputs, each said switching unit being capable of optically coupling said first output thereof to a selected one of said first and second inputs thereof, and being capable of optically coupling said second output thereof to a selected one of said first and second inputs thereof, wherein said outputs of said demultiplexer are each coupled to said first input of a respective said switching unit, said protection input terminals are each coupled to said second input of a respective said switching unit, and said protection output terminals are each coupled to said second output of a respective said switching unit;

a multiplexer having an output coupled to said optical output terminal, and having a plurality of inputs which are each coupled to said first output of a respective said switching unit, said multiplexer being operable to optically multiplex onto said output respective optical component signals present at each of said inputs thereof;

an optical drop coupler coupled between said optical input terminal and said demultiplexer, said optical drop coupler being operable to forward a first copy of said input signal to said demultiplexer and to drop a second copy of said input signal; and one or more drop terminals each operable to receive a respective one of said optical component signals included in said second copy of said optical signal dropped by said optical drop coupler.

2. An apparatus according to claim 1, wherein each said switching unit includes a first optical switch having first and second inputs respectively coupled to said first and second inputs of the switching unit, and having first and second outputs respectively coupled to said first and outputs of the switching unit.

3. An apparatus according to claim 1, wherein each said switching unit includes a third output, and is capable of optically coupling said third output to a selected one of said first and second inputs.

4. An apparatus according to claim 3, wherein each said switching unit includes:

a first optical switch having first and second inputs respectively coupled to said first and second inputs of the switching unit, having a first output coupled to said first output of the switching unit, and having a second output; and a second optical switch having an input coupled to said second output of said first optical switch, and having first and second outputs which are respectively coupled to said second and third outputs of the switching unit.

5. An apparatus according to claim 1, wherein said multiplexing unit further includes one or more optical filters each operable to extract from said second copy of said input signal and supply to a respective drop terminal a respective one of said component signals of said second copy of said input signal.

6. An apparatus, comprising a multiplexing unit which includes:

an optical input terminal to which can be applied an optical input signal that includes a plurality of optical component signals which are different;

an optical output terminal at which said multiplexing unit produces an optical output signal;

a plurality of protection input terminals;

a plurality of protection output terminals;

a further terminal;

a demultiplexer having an input coupled to said optical input terminal, and having a plurality of outputs, said demultiplexer being operable to optically isolate the component signals of the input signal, and to optically supply each of the isolated component signals to a respective one of said outputs thereof;

a plurality of switching units each having first and second inputs and first and second outputs, each said switching unit being capable of optically coupling said first output thereof to a selected one of said first and second inputs thereof, and being capable of optically coupling said second output thereof to a selected one of said first and second inputs thereof, wherein said outputs of said demultiplexer are each coupled to said first input of a respective said switching unit, said protection input terminals are each coupled to said second input of a respective said switching unit, and said protection output terminals are each coupled to said second output of a respective said switching unit;

a multiplexer having an output coupled to said optical output terminal, and having a plurality of inputs which are each coupled to said first output of a respective said switching unit, said multiplexer being operable to optically multiplex onto said output respective optical component signals present at each of said inputs thereof;

a portion operable to facilitate one of: causing one of the component signals from the input signal to be routed to said further terminal, and causing a component signal present at said further terminal to be included in the optical output signal;

wherein each said switching unit includes a third input and a third output, is capable of optically coupling said first output thereof to a selected one of said first, second and third inputs thereof, is capable of optically coupling said second output thereof to a selected one of said first, second and third inputs thereof, and is capable of optically coupling said third output thereof to a selected one of said first, second and third inputs thereof;

wherein said multiplexing unit includes a plurality of add terminals, one of which is said further terminal;

wherein said portion of said multiplexing unit couples each said add terminal to said third input of a respective said switching unit;

a first optical switch having first and second inputs respectively coupled to said second and third inputs of the switching unit, and having an output;

a second optical switch having first and second inputs respectively coupled to said first input of the switching unit and said output of said first optical switch, having a first output coupled to said first output of the switching unit, and which has a second output; and a third optical switch having an input coupled to said second output of said second optical switch, and having first and second outputs respectively coupled to said second and third outputs of the switching unit.

7. An apparatus, comprising first and second multiplexing units which each include:

an optical input terminal to which can be applied a respective optical input signal that includes a plurality of optical component signals which are different;

an optical output terminal at which said multiplexing unit produces an optical output signal;

a plurality of protection input terminals;

a plurality of protection output terminals;

a demultiplexer having an input coupled to said optical input terminal, and having a plurality of outputs, said demultiplexer being operable to optically isolate the component signals of the input signal, and to optically supply each of the isolated component signals to a respective one of said outputs thereof;

a plurality of switching units each having first and second inputs and first and second outputs, each said switching unit being capable of optically coupling said first output thereof to a selected one of said first and second inputs thereof, and being capable of optically coupling said second output thereof to a selected one of said first and second inputs thereof, wherein said outputs of said demultiplexer are each coupled to said first input of a respective said switching unit, said protection input terminals are each coupled to said second input of a respective said switching unit, and said protection output terminals are each coupled to said second output of a respective said switching unit;

a multiplexer having an output coupled to said optical output terminal, and having a plurality of inputs which are each coupled to said first output of a respective said switching unit, said multiplexer being operable to optically multiplex onto said output respective optical component signals present at each of said inputs thereof; and an optical drop coupler coupled between said optical input terminal and said demultiplexer, said optical drop coupler being operable to forward a first copy of said input signal to said demultiplexer and to drop a second copy of said input signal; and one or more drop terminals each operable to receive a respective one of said optical component signals included in said second copy of said optical signal dropped by said optical drop coupler;

wherein said protection output terminals of said first multiplexing unit are each coupled to a respective said protection input terminal of said second multiplexing unit, and said protection output terminals of said second multiplexing unit are each coupled to a respective said protection input terminal of said first multiplexing unit.

8. An apparatus, comprising a multiplexing unit which includes:

an optical input terminal to which can be applied an optical input signal that includes a plurality of optical component signals which are different;

an optical output terminal at which said multiplexing unit produces an optical output signal;

a plurality of protection input terminals;

a plurality of protection output terminals;

a demultiplexer having an input coupled to said optical input terminal, and having a plurality of outputs, said demultiplexer being operable to optically isolate the component signals of the input signal, and to optically supply each of the isolated component signals to a respective one of said outputs thereof;

a plurality of switching units each having first and second inputs and first and second outputs, each said switching unit being capable of optically coupling said first output thereof to a selected one of said first and second inputs thereof, and being capable of optically coupling said second output thereof to a selected one of said first and second inputs thereof, wherein said outputs of said demultiplexer are each coupled to said first input of a respective said switching unit, said protection input terminals are each coupled to said second input of a respective said switching unit, and said protection output terminals are each coupled to said second output of a respective said switching unit;

a multiplexer having an output coupled to said optical output terminal, and having a plurality of inputs which are each coupled to said first output of a respective said switching unit, said multiplexer being operable to optically multiplex onto said output respective optical component signals present at each of said inputs thereof;

an optical add coupler coupled between said multiplexer and said optical output terminal; and one or more add terminals each coupled to said optical add coupler;

wherein said optical add coupler is operable to optically combine optical signals from said output of said multiplexer and from said add terminals in order to obtain said optical output signal for said optical output terminal.

9. An apparatus according to claim 8, wherein each said switching unit includes a first optical switch having first and second inputs respectively coupled to said first and second inputs of the switching unit, and having first and second outputs respectively coupled to said first and outputs of the switching unit.

10. An apparatus according to claim 8, wherein each said switching unit includes a third output, and is capable of optically coupling said third output to a selected one of said first and second inputs.

11. An apparatus according to claim 10, wherein each said switching unit includes:

a first optical switch having first and second inputs respectively coupled to said first and second inputs of the switching unit, having a first output coupled to said first output of the switching unit, and having a second output; and a second optical switch having an input coupled to said second output of said first optical switch, and having first and second outputs which are respectively coupled to said second and third outputs of the switching unit.

12. An apparatus according to claim 8, wherein said multiplexing unit includes:

an optical drop coupler coupled between said optical input terminal and said demultiplexer, said optical drop coupler being operable to forward a first copy of said input signal to said demultiplexer and to drop a second copy of said input signal; and one or more drop terminals each operable to receive a respective one of said optical component signals included in said second copy of said optical signal dropped by said optical drop coupler.

13. An apparatus, comprising first and second multiplexing units which each include:

an optical input terminal to which can be applied a respective optical input signal that includes a plurality of optical component signals which are different;

an optical output terminal at which said multiplexing unit produces an optical output signal;

a plurality of protection input terminals;

a plurality of protection output terminals;

a demultiplexer having an input coupled to said optical input terminal, and having a plurality of outputs, said demultiplexer being operable to optically isolate the component signals of the input signal, and to optically supply each of the isolated component signals to a respective one of said outputs thereof;

a plurality of switching units each having first and second inputs and first and second outputs, each said switching unit being capable of optically coupling said first output thereof to a selected one of said first and second inputs thereof, and being capable of optically coupling said second output thereof to a selected one of said first and second inputs thereof, wherein said outputs of said demultiplexer are each coupled to said first input of a respective said switching unit, said protection input terminals are each coupled to said second input of a respective said switching unit, and said protection output terminals are each coupled to said second output of a respective said switching unit;

a multiplexer having an output coupled to said optical output terminal, and having a plurality of inputs which are each coupled to said first output of a respective said switching unit, said multiplexer being operable to optically multiplex onto said output respective optical component signals present at each of said inputs thereof;

an optical add coupler coupled between said multiplexer and said optical output terminal; and one or more add terminals each coupled to said optical add coupler;

wherein said optical add coupler is operable to optically combine optical signals from said output of said multiplexer and from said add terminals in order to obtain said optical output signal for said optical output terminal;

wherein said protection output terminals of said first multiplexing unit are each coupled to a respective said protection input terminal of said second multiplexing unit, and said protection output terminals of second multiplexing unit are each coupled to a respective said protection input terminal of said first multiplexing unit.

* * * * *

UNITED STATES PATENT AND TRADEMARK OFFICE
CERTIFICATE OF CORRECTION

PATENT NO. : 6,922,530 B1  Page 1 of 1
APPLICATION NO. : 09/544662
DATED : July 26, 2005
INVENTOR(S) : Kauffeldt et al.

It is certified that error appears in the above-identified patent and that said Letters Patent is hereby corrected as shown below:

Column 10, Line 35, after "and" insert -- second --.
Column 13, Line 27, after "and" insert -- second --.

Signed and Sealed this

Fifth Day of February, 2008

JON W. DUDAS
*Director of the United States Patent and Trademark Office*